United States Patent [19]

Kaufman et al.

[11] Patent Number: 5,442,733
[45] Date of Patent: Aug. 15, 1995

[54] METHOD AND APPARATUS FOR GENERATING REALISTIC IMAGES USING A DISCRETE REPRESENTATION

[75] Inventors: Arie E. Kaufman, Plainview, N.Y.; Daniel Cohen, Tel Avi, Israel; Roni Yagel, Baxley, Ohio

[73] Assignee: The Research Foundation of State University of New York, Albany, N.Y.

[21] Appl. No.: 855,223

[22] Filed: Mar. 20, 1992

[51] Int. Cl.⁶ .............................................. G06T 15/00
[52] U.S. Cl. .................................. 395/124; 395/119; 364/413.13
[58] Field of Search ................ 395/119, 120, 121, 123, 395/124, 127, 128, 133; 364/413.13; 324/306

[56] References Cited

U.S. PATENT DOCUMENTS

| | | | |
|---|---|---|---|
| 4,987,554 | 1/1991 | Kaufman | 395/124 |
| 5,038,302 | 8/1991 | Kaufman | 395/124 |
| 5,101,475 | 3/1992 | Kaufman et al. | 395/124 |
| 5,166,876 | 11/1992 | Cline et al. | 364/413.13 |
| 5,204,625 | 4/1993 | Cline et al. | 324/306 |
| 5,226,113 | 7/1993 | Cline et al. | 395/124 |

OTHER PUBLICATIONS

J. Foley, et al., "Recursive Ray Tracing", *Computer Graphics, Principles and Practice*, 1990.

Primary Examiner—Almis R. Jankus
Attorney, Agent, or Firm—Hoffmann & Baron

[57] ABSTRACT

A method for generating realistic images using discrete representations employs a discrete voxel based representation of the scene within a three-dimensional (3-D) Cubic Frame Buffer of infinitesimal voxels. Each voxel stores information corresponding to the attributes of that portion of the scene. Numerous sight rays are traversed through the Cubic Frame Buffer. When a non-transparent infinitesimal voxel is encountered by a traversing sight ray, a hit is recognized. The attributes of that portion of the object that is encountered are then used for generating secondary rays. Depending upon the number and characteristics of the secondary rays that are generated, an appropriate representation of the scene can be generated from any viewing direction.

14 Claims, 13 Drawing Sheets

FIG. 10

```
while (A − −) {
    SetVoxel (ptr);
    if (e_y < 0) {
        e_y += dy_x ;
        if (e_z < 0) {
            e_z += dz_x ;
            ptr += offset_x ;
        }
        else {
            e_z += dz_xz ;
            ptr += offset_xz ;
        }
    } else {
        e_y += dy_xy ;
        if (e_z < 0) {
            e_z += dz_x ;
            ptr += offset_xy ;
        }
        else {
            e_z += dz_xz ;
            ptr += offset_xyz ;
        }
    }
}
```

FIG. 11

```
loop {

SetVoxel(ptr);
    if (e_y < 0) {
        e_y += dy_x ;
        if (e_z < 0) {
            e_z += dz_x ;
            ptr += offset_x ;
            if ( dx − −) break ;
        }
        else {
            e_z += dz_xz ;
            ptr += offset_xz ;
            if ( dx − −) break ;
        }
    } else {
        if (e_z < 0) {
            e_y += dy_xy ;
            e_z += dz_x ;
            ptr += offset_xy ;
            if ( dx − −) break ;
        }
        else {            /* force a zy step */
            e_y += dy_y ;
            e_z += dz_z ;
            ptr += offset_zy ;
        }
    }
}
```

```
while (n −−)
    SetVoxel(ptr);

if (exy < 0) {
        if (exz < 0) {
                ptr += offsetx ;
                exy += B2;   exz += C2;
        }
        else {
                ptr += offsetz ;
                exz −= A2;   ezy += B2;
        }
    }
    else {
        if (ezy < 0) {
                ptr += offsetz ;
                exz −= A2;   ezy += B2;
        }
        else {
                ptr += offsety ;
                exy −= A2;   ezy −= C2;
        }
    }
}
```

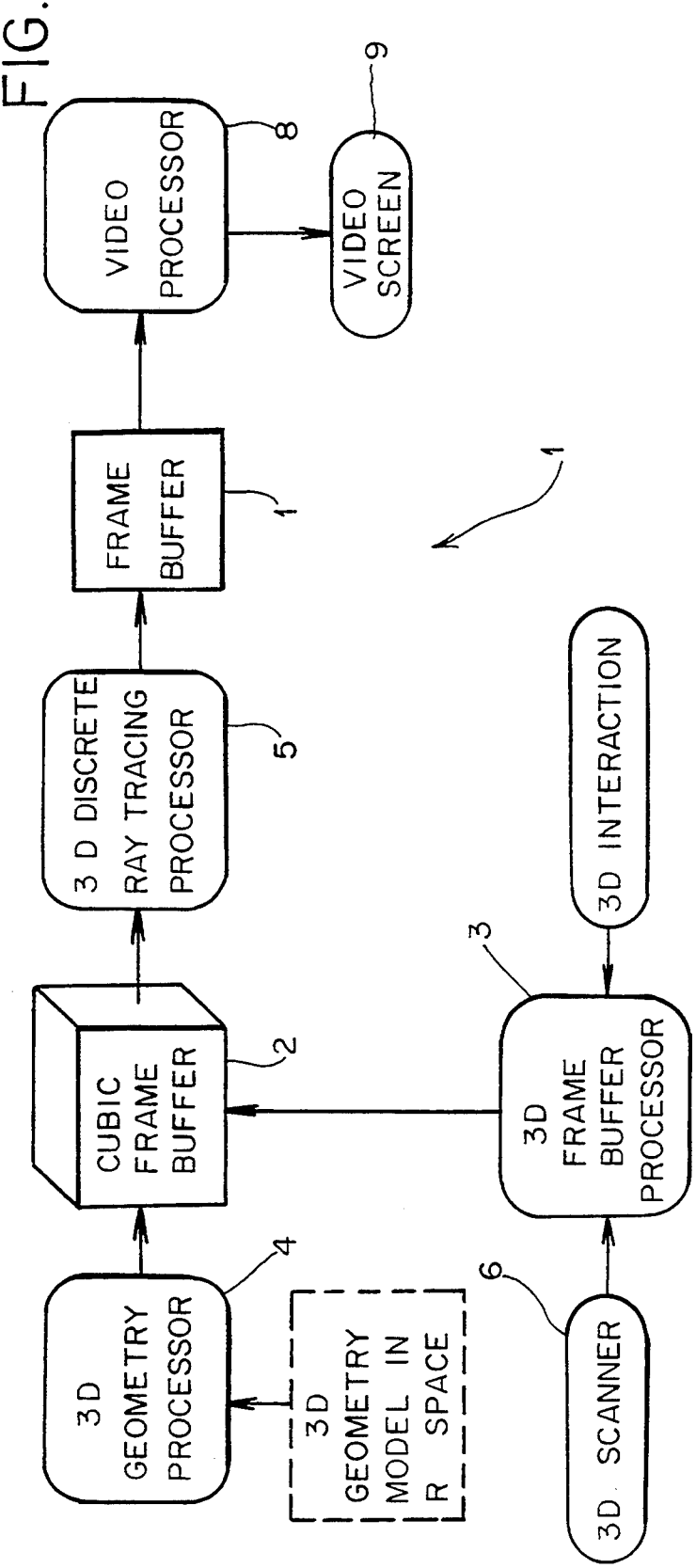
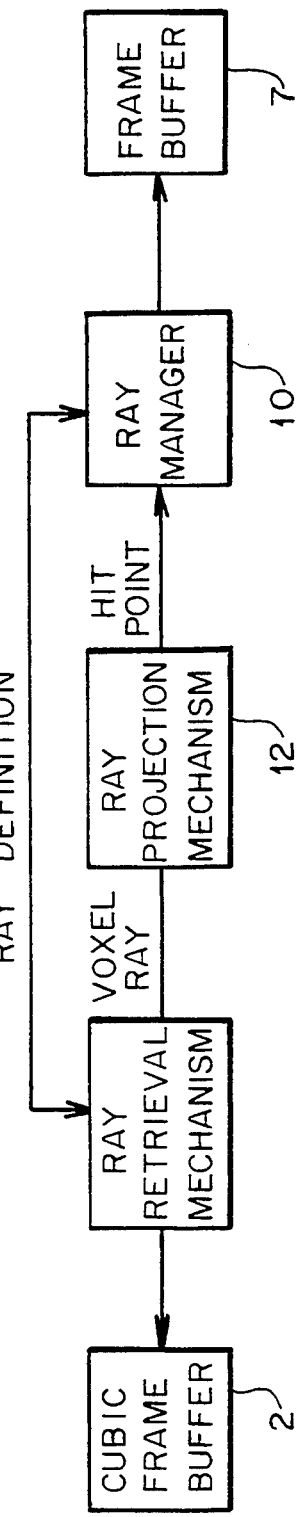

METHOD AND APPARATUS FOR GENERATING REALISTIC IMAGES USING A DISCRETE REPRESENTATION

BACKGROUND OF THE INVENTION

The present invention relates to computer graphic systems, and more particularly relates to computer graphic systems that utilize discrete 3-D voxel representations within a 3-D Cubic Frame Buffer of unit voxels.

Ray casting methods, which employ only primary rays, have been applied to volumetric datasets such as those occurring in biomedical imaging and scientific visualization applications. Ray casting has also been applied to estimate illumination of various amorous phenomena by compositing evenly-spaced samples along primary viewing rays. Since ray casting utilizes only primary rays, it cannot support the simulation of light phenomena such as reflection, shadows, and refraction of intervening objects. Therefore, ray casting cannot always produce a realistic representation of a scene.

A more complex and realistic method of scene visualization is called ray tracing. Ray tracing involves projecting primary sight rays through a model of a scene. Once a primary ray intersects an object, secondary rays are generated which may be dependent upon the angle of incidence to the object and the surface characteristics of the object. The study of ray tracing of volume densities has included, among others, a probabilistic simulation of light passing through and being reflected by clouds of small particles, and the light-scattering equations of densities within a volume grid such as clouds, fog, flames, dust and particle systems.

Despite its good image quality, popularity, power, and simplicity, ray tracing has the reputation of being computationally very expensive. The basic operation of ray tracing involves calculating the intersection points of rays and objects. This intersection operation has been reported to consume at least 95% of the computer operation time involved for generating complex scenes.

A major strategy for reducing the computer time required for ray tracing involves diminishing the computation time required to determine a ray-object intersection. This can be accomplished by devising efficient methods for intersecting rays with specific objects or by reducing the number of objects being tested against the ray. The latter is mainly achieved by two alternative methods, hierarchical bounding of volumes and space subdivision. The hierarchical bounding of volumes method utilizes a geometric primitive that encapsulates an object. The geometric primitive has a relatively uncomplicated boundary equation which makes it relatively easy to compute the intersection of a ray with the boundary of the object. Improved performance has also been achieved by grouping the geometric primitive bounding volumes in hierarchies and employing various heuristic methods.

The space subdivision method divides a world space into a set of rectangular volumes called cells. Each cell has a corresponding list of all objects that have a portion of their volume residing in the cell. Space subdivision can be implemented with either nonuniform or uniform spatial subdivision. Nonuniform spacial subdivision divides the object space representing the scene into portions of varying sizes to suit the features of the scene.

In contrast to nonuniform spatial subdivision, uniform spatial subdivision divides the object space that represents the scene into uniform size cells organized in a 3-D lattice. Such methods employ a 3-D digital differential analyzer (3DDDA) for incrementally computing all cells that are intersected by the transmitted ray. Thereafter, only the objects that are listed as having a portion of their volume residing in the pierced cell are candidates for ordered ray-object intersection calculations. This reduces the number of calculations that need to be performed in order to determine which objects of the scene are contacted by the ray. However, even this improved method causes many extraneous calculations to be performed. As a result, the above processes are still somewhat inefficient because time consuming intersection calculations of the ray with a list of objects contained within the cell must be performed.

It is therefore an object of the present invention to provide a method for reducing the inefficiencies associated with ray tracing techniques set forth above.

It is an object of the present invention to provide a method to generate realistic images utilizing a discrete representation of objects of the scene being represented.

It is another object of the present invention to provide a ray tracing method which traverses 3-D discrete rays through discrete 3-D voxel representations stored in a 3-D Cubic Frame Buffer to create photorealistic images of a scene.

It is a further object of the present invention to provide a ray tracing method which overcomes the inherent disadvantages of known ray tracing methods.

Other and further objects will be made known to the artisan as a result of the present disclosure and it is intended to include all such objects which are realized as a result of the disclosed invention.

SUMMARY OF THE INVENTION

In accordance with one embodiment of the present invention, the method for generating a 2-D realistic image using discrete representations of 3-D continuous objects includes forming a discrete 3-D voxel representation of each 3-D continuous object of a scene. The 2-D realistic image is generated on a display device having a plurality of pixels. Each discrete voxel representation is stored in a Cubic Frame Buffer of voxels and a voxel connectivity is selected for a plurality of families of 3-D discrete rays which will act upon the discrete representation of 3-D continuous objects. Each family of 3-D discrete rays includes at least a primary ray, a shadow ray, and if the characteristics of the object permits, reflection and/or transmission of the primary ray to produce secondary rays. A shadow ray is sent to each light source from each intersection of a ray and an object in order to determine the intensity of illumination of the light source at that intersection point. Each family of 3-D discrete rays is traversed and reflected through the Cubic Frame Buffer for each pixel that is used to form the 2-D realistic image. Then, for each of the plurality of families of 3-D discrete rays, encounters are detected between the families of 3-D discrete rays and the discrete representation of 3-D continuous objects. Each encounter generates an illumination value corresponding to each family of 3-D discrete rays. The illumination values for each family of rays are, in turn, combined to provide a composite illumination value for that family. Each composite illumination value relates to a pixel value for generating the 2-D realistic image.

In another embodiment of the present invention, a method is provided for generating a 3-D voxel representation of a 3-D continuous line by determining a plurality of geometric parameters which represent the continuous line. A first voxel connectivity is selected which will be used to represent the line in 3-D discrete voxel space. A set of relative Cubic Frame Buffer memory address offsets are determined which interrelate neighboring voxels of the Cubic Frame Buffer. Then, by using the set of geometric parameters and the selected voxel connectivity, a plurality of threshold variables and a plurality of threshold variable increments are calculated. A starting voxel is selected which corresponds to the set of geometric parameters representing the continuous line. A neighboring voxel is then determined along the continuous line based upon the threshold variables and a family of decisions. Thereafter, a stepping process is performed in the Cubic Frame Buffer according to the Cubic Frame Buffer memory address offsets to locate the neighboring voxel within the Cubic Frame Buffer. The threshold variables are utilized to determine whether it is appropriate to step along the x, y and z axes to choose the next voxel to properly represent the 3-D continuous line. Finally, the plurality of threshold variables are updated using the plurality of threshold variable increments so that the decision process can be repeated to locate the next neighboring voxel along the continuous line.

Also provided is a method for generating a 3-D discrete voxel representation of a 2-D continuous object in 3-D space by selecting a surface connectivity for the 3-D discrete voxel representation and determining a set of geometric parameters corresponding to the 2-D continuous object in 3-D space. Then a base line and a template line are specified based upon the geometric parameters. Voxel connectivities are selected for the base line and template line corresponding to the selected surface connectivity. The boundaries of the 2-D continuous object in 3-D space are determined based upon the set of geometric parameters. Then, the base line and template line are stored according to the selected voxel connectivity. Finally, the template line is replicated for each voxel along the base line within the specified boundaries of the 2-D continuous object in 3-D space and the replicas are stored in the Cubic Frame Buffer.

Consequently, the present invention provides a ray tracing method which eliminates the computationally expensive ray-object intersections required for prior ray tracing methods. Furthermore, the present invention provides an efficient method for voxelizing 3-D continuous representations of objects and an efficient method for voxelizing 3-D continuous representations of lines and rays. Additionally the present invention provides a method for efficiently determining a corresponding location of the 3-D Cubic Frame Buffer. Moreover, the ray tracing method of the present invention provides a computationally faster method than prior art ray tracing methods which is practically insensitive to the complexity of a scene or object that is to be ray traced.

A preferred form of the method for generating a 2-D realistic image having a plurality of pixels using discrete representations of 3-D continuous objects, as well as other embodiments, objects, features and advantages of this invention, will be apparent from the following detailed description of illustrative embodiments thereof, which is to be read in connection with the accompanying drawings.

BRIEF DESCRIPTION OF THE DRAWINGS

FIG. 10 is a computer implementation of an efficient symmetrical method for voxelizing 26-connected lines according to the method of the present invention;

FIG. 11 is a computer implementation of an efficient symmetrical method for voxelizing 18-connected lines according to the method of the present invention;

FIG. 12 is a computer implementation of an efficient symmetrical method for voxelizing 6-connected lines according to the method of the present invention;

FIG. 14 is a block diagram of a 3-D voxel-based graphics workstation on which the method for generating realistic images using a discrete representation can be implemented;

FIG. 15 is a block diagram of a 3-D discrete ray tracing processor for use in the 3-D voxel-based graphics workstation;

DETAILED DESCRIPTION OF THE PREFERRED EMBODIMENTS

The method of the present invention, hereinafter referred to as volumetric ray tracing, is based on traversing 3-D discrete voxelized rays through a 3-D Cubic Frame Buffer that contains a discrete, fully digitized voxel representation of a scene. Volumetric ray tracing utilizes primary rays and secondary rays to create "photo realistic images" which include the visualization of light phenomena such as reflection, shadows, and refraction of intervening objects.

Volumetric ray tracing basically has two phases of operation, a preprocessing voxelization phase and a discrete ray tracing phase. During the voxelization phase, a geometric model of a scene is digitized or voxelized using incremental 3-D scan-conversion methods. These methods convert the continuous representation of the geometric model to a discrete voxel representation within the 3-D Cubic Frame Buffer. However, if the geometric model being used is already voxelized, such as in sampled or computed data sets, the voxelization phase need not be performed.

The second phase, referred to as discrete ray tracing, involves projecting a discrete family of voxelized rays through the 3-D Cubic Frame Buffer in search of the first non-transparent voxel that represents a portion of a 3-D object of the scene. The encounter of a non-transparent voxel indicates that the traversing ray located a nontransparent surface of an object.

A voxel is infinitesimally small and homogeneous. A voxel is the 3-D conceptual counterpart of the 2-D pixel. Each voxel is a quantum unit of volume that has numerical values associated with it representing some measurable properties or attributes of the real object or phenomenon corresponding to that voxel location. In the preferred embodiment of the invention, the size of the voxels are chosen so that each voxel contains information relating to only one object of the scene. The aggregate of voxels are stored as a 3-D grid of voxels, also called the 3-D Cubic Frame Buffer, 3-D Raster or Volume Buffer.

Figure 1:
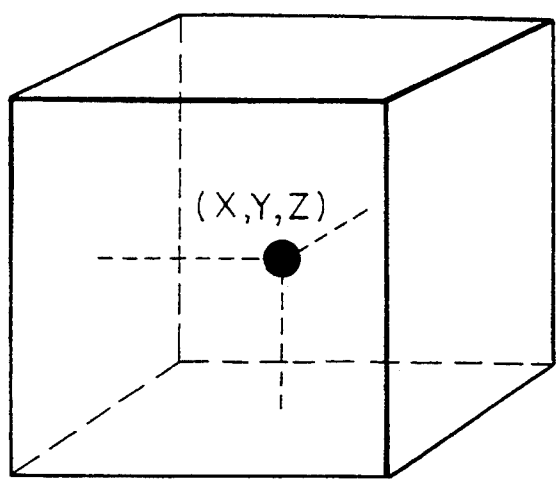
FIG. 1 is a graphical representation of a single voxel centered at a corresponding grid point (x, y, z)

Referring now to FIG. 1 of the drawings, a voxel is represented by a tiny cube centered at a corresponding 3-D grid point (x, y, z). Although there are slight differences between a grid point and a voxel, the terminology may be used interchangeably. A group of occupied voxels of the same type can be positioned relative to one another in a variety of ways so as to generate different voxel connectivities. The manner in which contiguous or neighboring voxels are connected or arranged with respect to one another is a very important concept in voxelization and it is commonly called voxel connectivity. Connectivity refers to how unit voxels are grouped together to synthesize voxel-based image representations of 3-D continuous geometric models.

Referring to FIGS. 2A through 2C and 3A through 3C of the drawings, the three types of possible voxel connections among neighboring voxels are illustrated. Similar to the manner in which a unit in an apartment building has different neighboring units situated in front, in back, to the side and below the unit, each voxel (x, y, z) in discrete 3-D voxel-image space $Z^3$ can have three kinds of neighbors as well. These three types of neighboring voxels are defined below by the following definitions:

(1) A voxel can have 6 direct neighbors at positions:
  (x+1, y, z), (x−1, y, z), (x, y+1, z), (x, y−1, z), (x, y, z+1), and (x, y, z−1).

(2) A voxel has 12 indirect neighbors at positions
  (x+1, y+1, z), (x−1, y+1, z), (x+1, Y−1, z), (x−1, y−1, z), (x+1, y, z+1), (x−1, y, z+1), (x+1, y, z−1), (x−1, y, z−1), (x, y+1, z+1), (x, y−1, z+1), (x, y+1, z−1), and (x, y−1, z−1).

(3) A voxel has 8 remote neighbors at positions:
  (x+1, y+1, z+1), (x+1, y+1, z−1), (x+1, y−1, z+1), (x+1, y−1, z−1), (x−1, y+1, z+1), (x−1, y+1, z−1), (x−1, y−1, z+1), and (x−1, y−1, z−1).

Figure 2A:
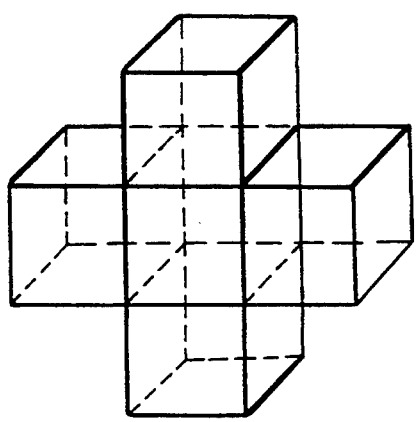
FIG. 2A is a schematic representation of some neighboring voxels that share a face.
Figure 2B:
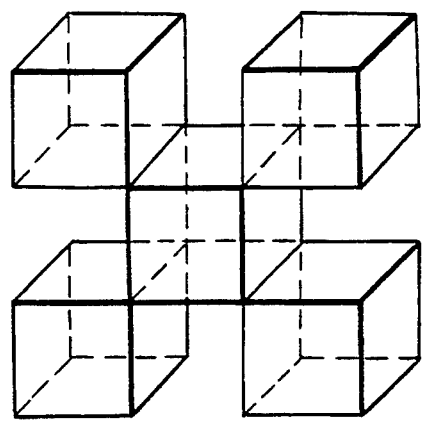
FIG. 2B is a schematic representation of some voxels that share a edge.
Figure 2C:
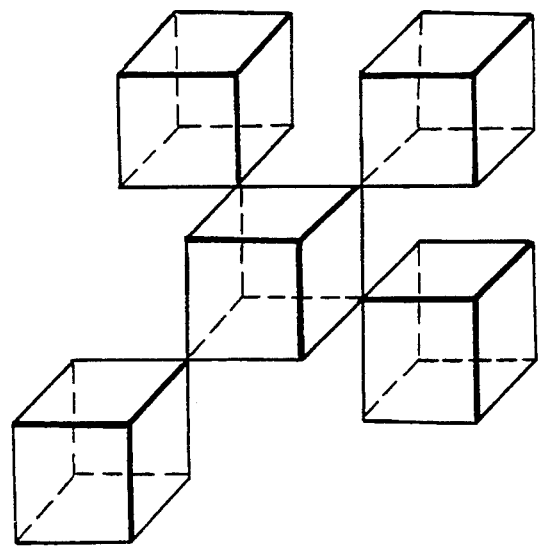
FIG. 2C is a schematic representation of some voxels that share a corner.

The three kinds of neighboring voxels defined above can be specified in terms of whether voxels share a face (i.e., a surface), a side (i.e., edge) or a corner (i.e., a point) with a neighboring voxel, as illustrated in FIGS. 2A, 2B and 2C, respectively.

Figure 3A:
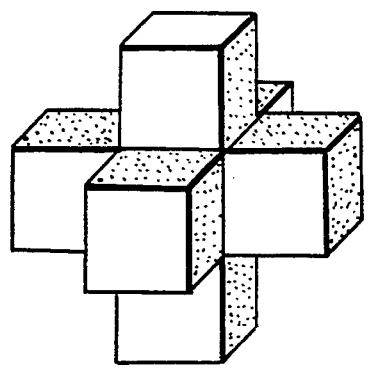
FIG. 3A is a schematic representation of neighboring voxels arranged according to the definition of 6-connected neighbors.
Figure 3B:
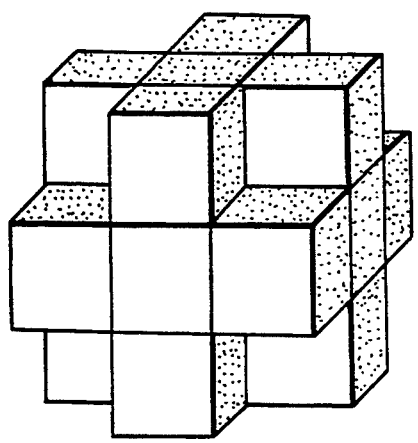
FIG. 3B is a schematic representation of neighboring voxels arranged according to the definition of 18-connected neighbors.
Figure 3C:
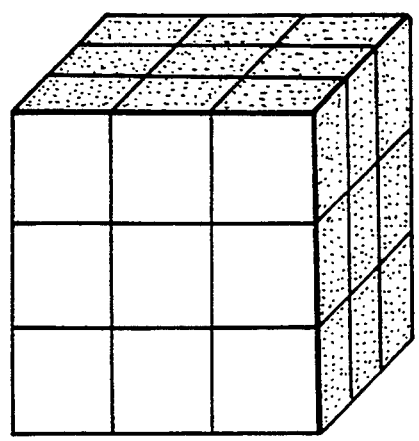
FIG. 3C is a schematic representation of neighboring voxels arranged according to the definition of 26-connected neighbors.

In discrete 3-D voxel image space $Z^3$, the 6 direct neighbors that share a face are defined as 6-connected neighbors as graphically illustrated in FIG. 3A. The combination of the 6 direct and 12 indirect neighbors that share a face or an edge are defined as 18-connected neighbors and are graphically illustrated in FIG. 3B. All three kinds of neighbors including those that either share a face, an edge or a corner are defined as 26-connected neighbors and are illustrated in FIG. 3C.

Figure 4A:
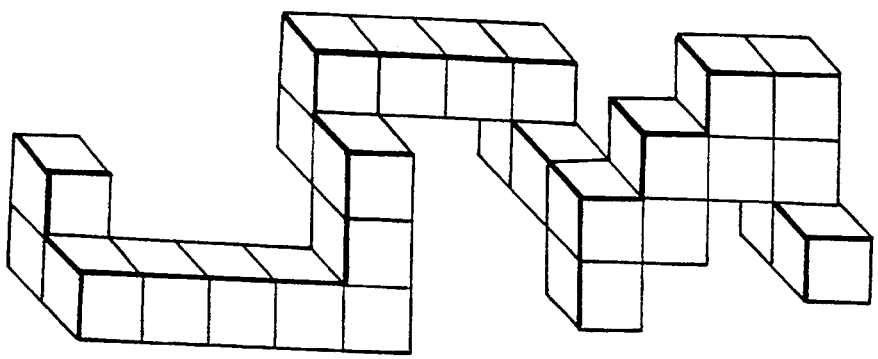
FIG. 4A is a schematic representation of a sequence of voxels arranged in a 6-connected path.
Figure 4B:
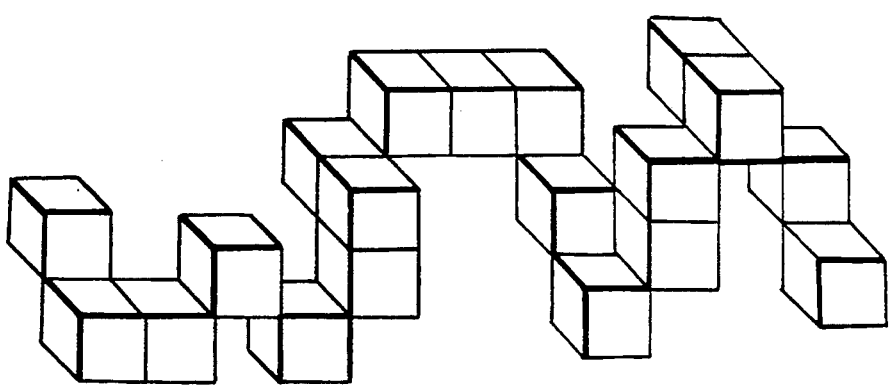
FIG. 4B is a schematic representation of voxels arranged in an 18-connected path.
Figure 4C:
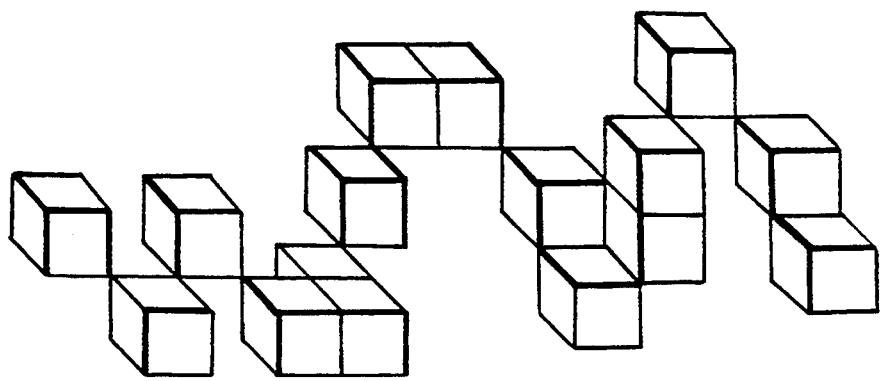
FIG. 4C is a schematic representation of a sequence of voxels arranged in a 26-connected path.

Referring now to FIGS. 4A, 4B and 4C, the three principal types of paths of connected voxels in $Z^3$ space are graphically illustrated. In FIG. 4A, a 6-connected path is defined as a sequence of voxels such that consecutive pairs are 6-connected neighbors. In FIG. 4B, an 18-connected path is defined as a sequence of 18-connected neighbor voxels, while as shown in FIG. 4C, a 26-connected path is defined as a sequence of 26-connected neighbor voxels. From the above-defined and described voxel path connections and arrangements, any type of discrete 3-D voxel-based model can be constructed in $Z^3$ space in a 3-D Cubic Frame Buffer. The type of connectivity chosen specifies the number of voxel "options" that are available when determining which sequence of voxel connections best represents the 3-D continuous object when stepping in the coordinate directions of discrete 3-D voxel space during a 3-D scan-conversion process.

Figure 5A:
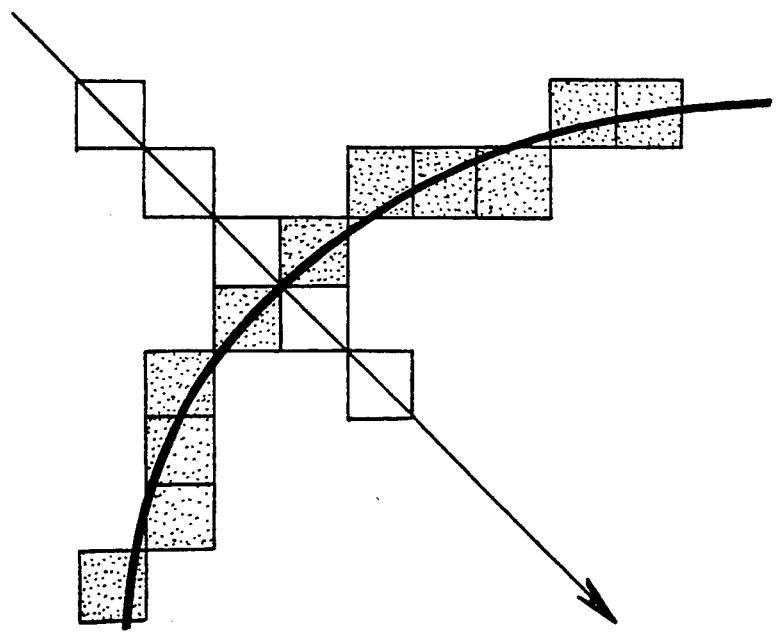
FIG. 5A is a 2-D schematic representation of a 6-connected ray passing through a 6-connected surface that has a 26-connected tunnel.
Figure 5B:
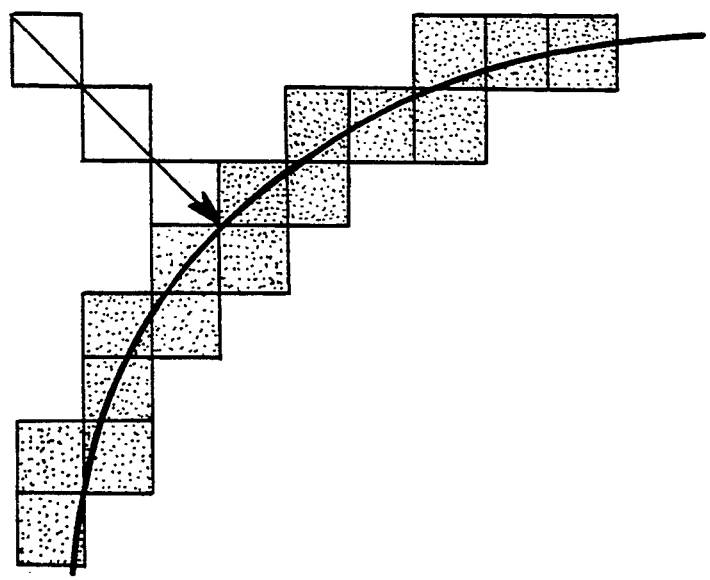
FIG. 5B is a 2-D schematic of a 6-connected ray which cannot pass through a thicker 6-connected surface that lacks a 26-connected tunnel.

Voxelization can also be used to define a 3-D discrete surface. In order for a voxelized surface to approximate a continuous surface, the voxels must be connected in a particular manner (e.g., 26-connected). However, connectivity does not fully characterize the surface because the voxelized surface may contain local discrete holes, commonly referred to as "tunnels" that are not present in the continuous representation of the surface. A tunnel refers to a region in a voxelized surface that permits the passage of a discrete voxelized line or ray through the voxelized surface without detection by the surface. FIG. 5A illustrates a 26-connected line passing through a 26-connected object having a 26-connected tunnel. The tunnel, which can also be thought of as a hole, permits a voxelized line to cross from one side of the objects surface to the other without detection. A requirement of many surface voxelization methods is that the voxel representation of the continuous surface must be "thick enough" not to allow discrete voxelized rays or lines to pass through. A voxelized surface through which 26-connected rays do not penetrate is commonly referred to as a 26-tunnel-free surface. FIG. 5B illustrates a "thick" surface having 6-connected voxels and being a 26-tunnel-free surface. The decision as to which surface connectivity to use depends primarily on the connectivity of the discrete rays employed to detect surfaces during ray tracing.

As previously stated, volumetric ray tracing of geometric scenes begins with a preprocessing voxelization phase that precedes the actual ray tracing portion of the method. In the voxelization phase, the scene, which is a 3-D continuous scene, is converted into a discrete voxel representation of the scene by 3-D scan-converting or voxelizing each of the geometric objects comprising the scene. A 3-D voxelization of a given geometric object generates the set of voxels that best approximates the continuous representation of the object and stores the discrete voxel representation of the object in the 3-D Cubic Frame Buffer.

Many 3-D voxelization methods are available to generate a set of voxels to approximate the continuous representation of an object. However, it is appropriate at this juncture to describe an efficient and fast method of generating a 3-D voxel representation of a 2-D continuous object in 3-D space, such as a planar polygon, a planer disk, a Bezier curved surface or cylinder. For a given geometric object, the 3-D voxelization method described below generates the set of voxels that best approximates the continuous representation of the object and stores the discrete object as unit voxels in the Cubic Frame Buffer.

A voxelization method for generating a geometric object must be efficient, accurate and able to generate surfaces and objects that are thick enough to prevent voxelized rays from penetrating them or passing through without being detected. However, the surfaces must not be too thick and should contain only the minimum number of voxels necessary to prevent ray penetration. In this way the system does not waste time performing unnecessary steps which will not improve the efficiency of the ray tracing method.

Figure 6:
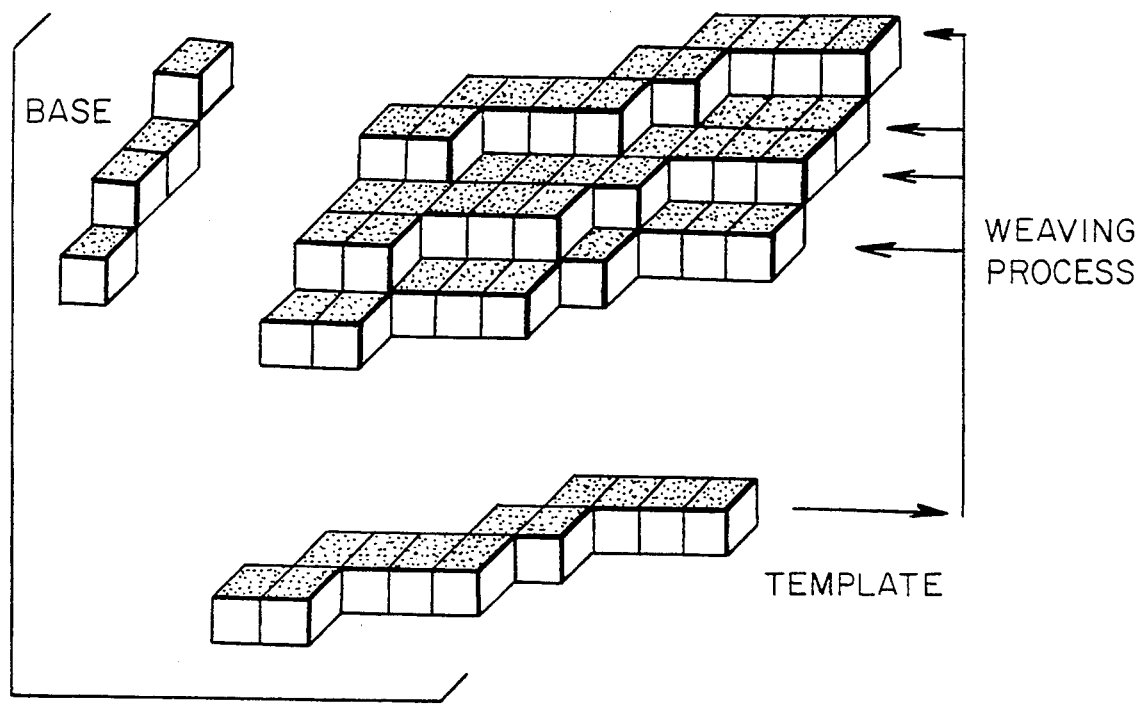
FIG. 6 is a schematic representation of the method of sweeping a template line along a base curve to form a 3-D voxelized representation of a 2-D continuous object in 3-D space.

Referring now to FIG. 6, a 3-D voxelization scan-conversion method hereinafter called "weaving" is shown and will be described. The weaving method involves sweeping or replicating an $N_1$-connected 3-D line called a template line along an $N_2$-connected 3-D line called a base. The weaving method generates a lattice having characteristics of both the template line and base. The topology or surface connectivity of the lattice is controlled by varying the connectivity of the template line and base lines.

Figure 7:
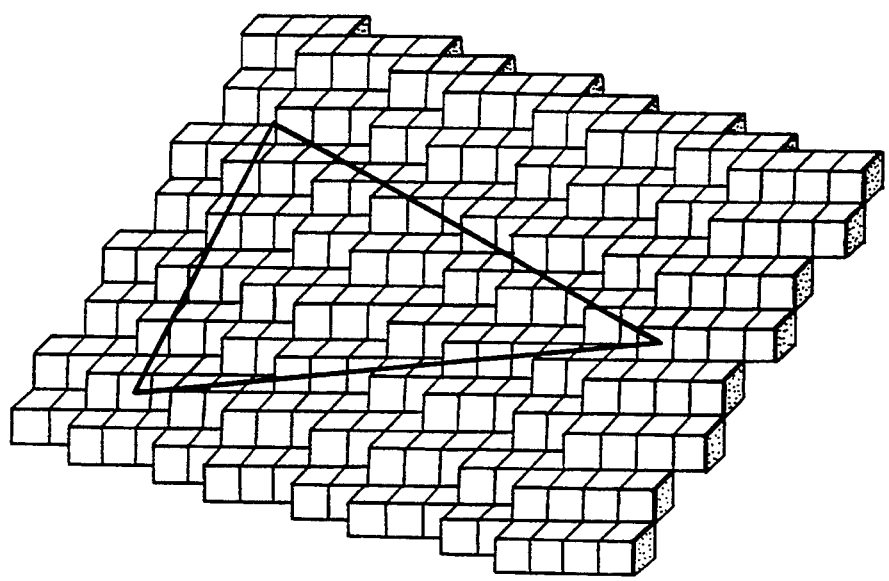
FIG. 7 is a schematic representation showing a voxelized planar surface generated by using a voxelized base line and template line and showing the set of voxels which are part of a triangle.

The 3-D voxelization scan-conversion weaving method for generating a 3-D voxel representation of a 2-D continuous object in 3-D space includes selecting a surface connectivity with which the 2-D continuous object in 3-D space is to be represented. The surface connectivity also corresponds to the thickness of the generated surface which controls whether the surface lacks an N-connected tunnel. The surface that is generated must be thick enough not to allow N-connected rays to penetrate or pass through the voxelized object without contacting at least one voxel. The method further includes determining a set of geometric parameters corresponding to the 3-D continuous object. The set of geometric parameters may include a geometric description of the 2-D continuous object in 3-D space that is to be generated including its boundaries and extreme points. For example, regarding the case of weaving a 2-D triangle as shown in FIG. 7, the geometric parameters would preferably include the coordinates of the three vertices.

The method further involves specifying a base line and a template line as shown in FIG. 6 based upon the aforementioned geometric parameters. In the preferred embodiment, the base line and template line can be 3-D lines or in other embodiments they can be 3-D quadratic curves. A voxel connectivity is then selected for the base line and template line based upon the selected surface connectivity since there is a correlation between the voxel connectivity of the template line and base line and the surface connectivity of the 3-D voxelized object. It should be noted that the template line connectivity is selected so that the required or desired surface connectivity is guaranteed when used with the corresponding base line connectivity. The voxel connectivity can be either 26-connected, 18-connected or 6-connected as previously described. In addition, the voxel connectivity can be selected to be anywhere therebetween if the connectivity is specified by the operator and if the method is designed to accommodate a non-symmetric connectivity.

As stated above, the voxel connectivity is selected so as to guarantee the predetermined or desired surface connectivity. Thereafter, the method involves determining the boundaries of the 2-D continuous object in 3-D space based upon the geometric parameters and storing the base line and template line in a Cubic Frame Buffer of voxels similar to that shown in FIG. 8A.

Finally, for each voxel along the base line of voxels stored in the Cubic Frame Buffer, a copy of the template line is replicated within the boundaries of the 2-D continuous object in 3-D space according to the geometric parameters. It should be noted that each replicated template line of voxels along the base line has a geometrically similar voxel arrangement with respect to neighboring template lines of voxels in order to guarantee a desired uniform surface-connectivity as shown in FIG. 7.

Preferably, the above-described voxelization process provides for each voxel its color or texture corresponding to the particular portion of the continuous object, and the voxel's normal vector. In addition, each voxel contains information relating to whether a light source is visible, occluded, or partly occluded/visible in relation to the position of the voxel along the surface of the 2-D continuous object in 3-D space. Actually, the view-independent portions of illumination including the ambient illumination and the sum of the attenuated diffuse illumination of all the visible light sources can also be precomputed and stored at the corresponding voxel location. If a point light source is assumed, a light buffer which is capable of increasing the processing speed of shadow rays can be used. All of the view-independent attributes that are precomputed during the voxelization stage and stored within the voxel are then readily accessible for increasing the speed of the ray tracing method. Depending upon the use, various other attributes and characteristics can be stored at corresponding voxel locations.

Once the discrete representation of the scene is available in a manner similar to that described above, sight rays are traced through the voxelized scene by traversing a 3-D discrete voxel representation of the ray through the 3-D Cubic Frame Buffer. A discrete ray traversal portion is therefore essential to the discrete ray tracing stage.

The method for discrete ray traversal generates a 3-D discrete voxelized line which is a set of N-connected voxels approximating the 3-D continuous line. The connectivity of the 3-D discrete line is a preselected attribute that specifies the way consecutive voxels are connected and related along the discrete voxelized line. The connectivity determines the final shape and penetration properties of the discrete 3-D line in relation to the voxelized object.

Figure 9:
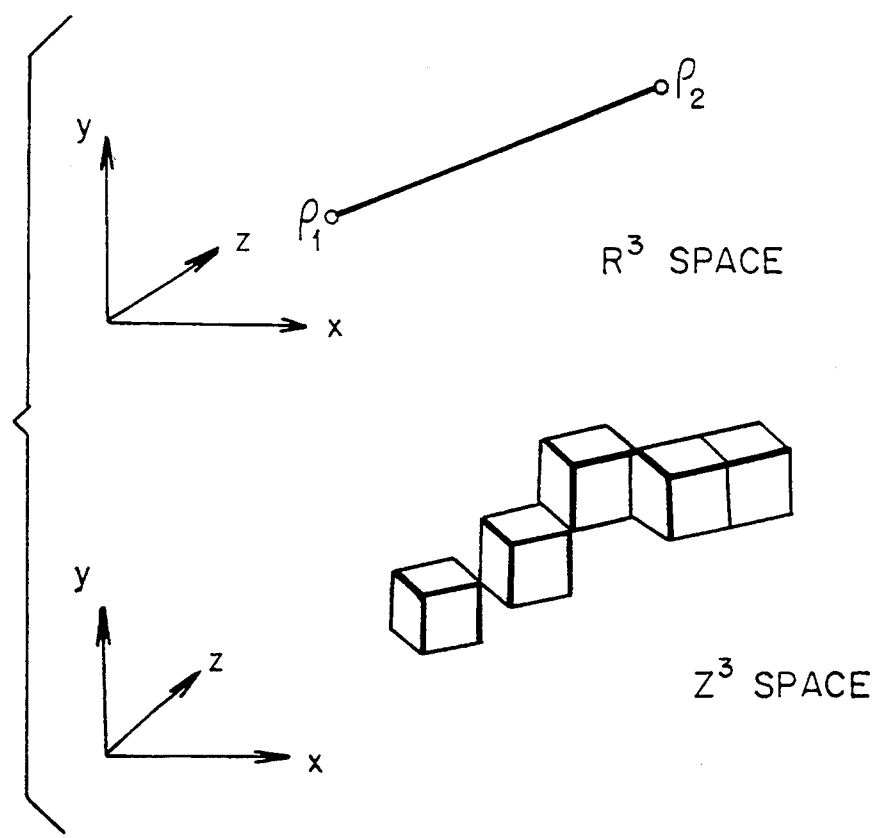
FIG. 9 is a representation of a straight line segment represented in continuous 3-D space transformed into a voxel-based representation of the line in discrete 3-D voxel-image space.

Referring now to FIG. 9, an efficient 3-D scan conversion method for generating a 3-D discrete voxel representation from a 3-D continuous line will now be described.

In FIG. 9, a 3-D straight line segment is defined by two end points $P_1$ and $P_2$ within a 3-D continuous Cartesian coordinate system ($R^3$ space) where the end points $P_1$ and $P_2$ have coordinates, $P_1=(x_1, y_1, z_1)$ and $P_2=(x_1+\Delta x, y_1+\Delta y, z_1+\Delta z)$. The goal of the 3-D scan-conversion method is to determine the sequence of voxels (x, y, z) within the 3-D discrete voxel space coordinate system, $Z^3$, that most clearly approximates the 3-D continuous line. Notably, this function is carried out incrementally using only integer arithmetic and symmetrical decisional process loops to determine the x, y, and z coordinates of each voxel.

The first stage of the method involves determining a plurality of geometric parameters which represent the 3-D continuous line. This initialization stage relates to defining and initializing the parameters that can be manipulated to represent the 3-D continuous line. These parameters include the characteristics of the 3-D continuous line including the start and stop point of the line. In the preferred embodiment, the start and stop point correspond to the boundaries of the Cubic Frame Buffer which is to be traversed by the ray. Utilizing this information, the start point of the 3-D voxelized ray is determined by specifying its x, y and z coordinates.

The first stage of the method further includes initialization and computing the number of points (n) to be sampled along the 3-D continuous line. Notably, the integer n corresponds to the number of voxels in the discrete set of n voxels in 3-D discrete voxel-image space $Z^3$. Also, integer n corresponds to the number of repetitions of the "decisional process loop" to be carried out in the present method, one repetition of the loop being executed for each set of voxel coordinate values $(x_i, y_i, z_i)$, for i=0, 1, . . . n.

Depending on the type of "voxel connectivity" desired or required in the voxel-based model of the 3-D straight line segment, (i.e. 6-connectivity, 18-connectivity, or 26-connectivity), integer n will take on a different integer value for a particular 3-D continuous straight line segment. For the case of 26-connected lines, the length of the line in voxels, is given by: n=MAX ($|\Delta x|, |\Delta y|, |\Delta z|$). The number of voxels in the line segment is exactly MAX ($|\Delta x|, |\Delta y|, |\Delta z|$) +1, including the starting point voxel.

The initialization stage further involves definition and initialization of the parameters and variables of the process. This step involves defining integer voxel-coordinate error decision variables $e_x$, $e_y$, and $e_z$ for x, y and z coordinate directions, respectively, and first and second decision variable increments $d1_x$, $d2_x$; $d1_y$, $d2_y$; and $d1_z$, $d2_z$ along each of the x, y and z coordinate directions.

In the preferred embodiment for the 3-D line segment in $Z^3$ space, the integer voxel-coordinate threshold variables $e_x$, $e_y$ and $e_z$ and threshold variable increments along each of the x, y and z coordinate directions are given as:

$e_x = 2 * \Delta x - n;$
$d1_x = 2 * \Delta x;$
$d2_x = 2 *(\Delta x - n);$ $e_y = 2 * \Delta y - n;$
$d1_y = 2 * \Delta y;$
$d2_y = 2 *(\Delta y - n);$ $e_z = 2 * \Delta z - n;$
$d1_z = 2 * \Delta z;$
$d2_z = 2 *(\Delta zx - n);$ The above set of parameter definitions are given in a preferred form in order to simplify the decisional process loop and operations therein for determining x, y and z coordinates for the voxels. However, these parameter definitions can take on other forms without departing from the invention.

Next, the first end point $P_1=(x_1, y_1, z_1)$ is written into the 3-D Cubic Frame Buffer and represents the coordinate values of the first voxel $V_{i=1}$ in $Z^3$ space. This beginning point can be indicated in the Cubic Frame Buffer by placing a pointer at the voxel point corresponding to the selected start point.

Entering the decisional process portion of the method, the integer coordinate values $x_i$, $y_i$ and $z_i$ for each voxel $V_i$ are determined so that the selected integer coordinate values are closest to a corresponding sample point of the 3-D continuous line in $R^3$ space. This decisional loop process is carried out for each $x_i$, $y_i$ and $z_i$ integer coordinate value i = 1, 2, . . . n, as follows.

For each x, y or z coordinate direction, the simple decision process is performed to determine whether to increment, decrement or maintain the current coordinate value for the next voxel. Although the steps of this method can be implemented in a variety of ways including by electrical, photoresponsive, chemical or mechanical means, FIG. 10 illustrates a manner for generating a 26-connected line utilizing a special or general purpose computer. Furthermore, FIGS. 11 and 12 illustrate a manner for generating an 18-connected line and a 6-connected line respectively, using a special or general purpose computer.

Figure 8:
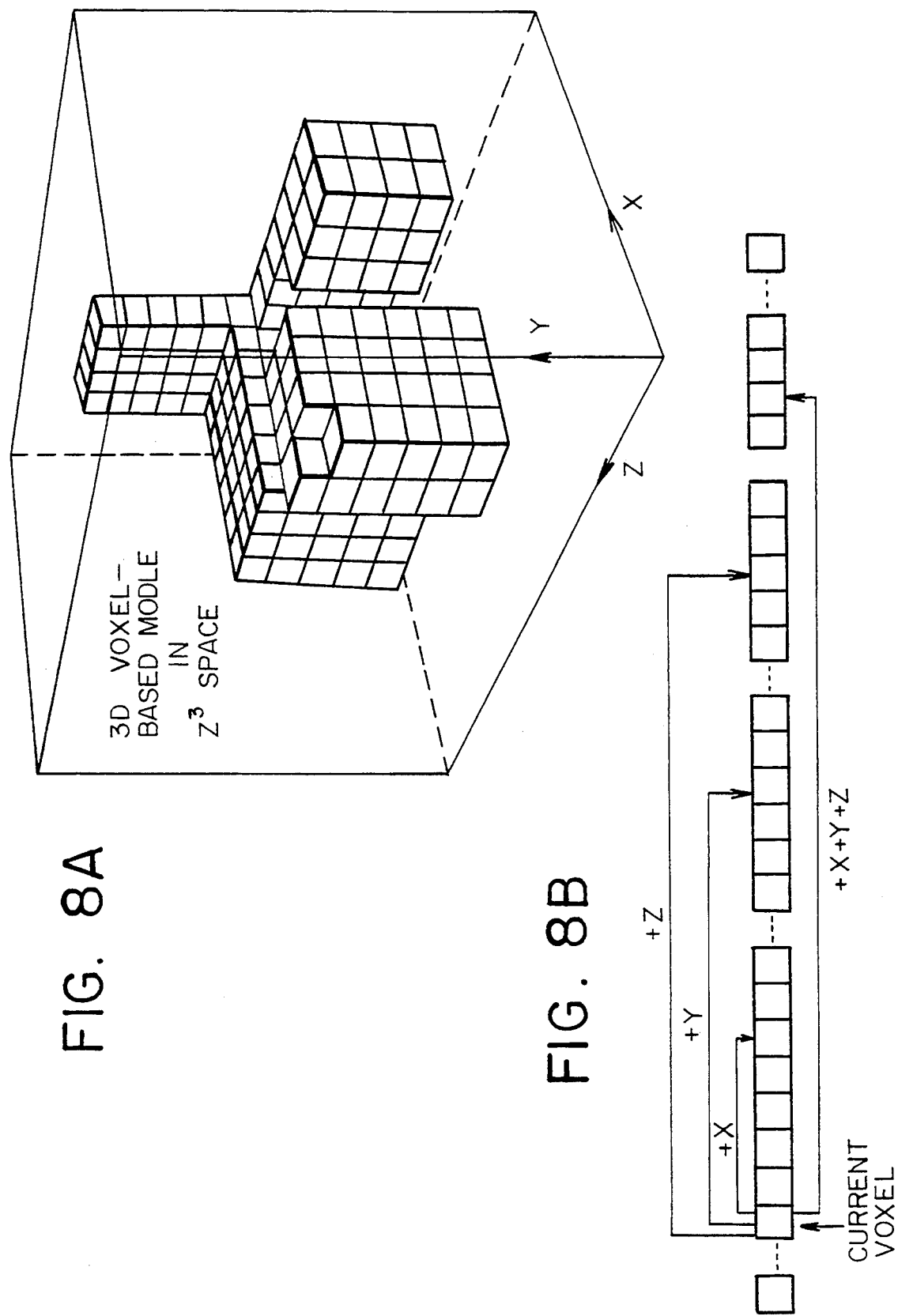
FIG. 8A is a representation of a 3-D model of the 3-D Cubic Frame Buffer of the voxel-based graphics system.
FIG. 8B is a representation of the Cubic Frame Buffer of FIG. 8A showing the serial interconnection and access of all voxel locations.

Next, a first voxel connectivity is selected which will be used to determine the manner in which the 3-D continuous line will be represented in 3-D voxel space. As previously stated, the selected voxel connectivity can be either 26, 18 or 6-connected. Thereafter, a set of related Cubic Frame Buffer memory address offsets are determined. The Cubic Frame Buffer memory address offsets interrelate all neighboring voxels along the 3-D voxelized line according to their relative position in the Cubic Frame Buffer of voxels. Even though the Cubic Frame Buffer memory is represented as a 3-D array of storage units as shown in FIG. 8A, actually, the memory units are serially interconnected and accessed as shown in FIG. 8B. The memory address offsets permit a particular voxel which represents the 3-D continuous line to be located and accessed in a relatively fast manner. Therefore, if the next selected successive voxel used to represent the 3-D continuous line includes a step in the x-direction, y-direction and the z-direction, one jump in memory is required to locate the appropriate voxel.

For example, depending upon the size of the Cubic Frame Buffer, the memory address offset for one unit move in the x-direction could be 1 voxel space. However, a move in the y-direction from the current voxel could require a jump of 8 voxels while a move in the z-direction from the current voxel could require a jump of 64 voxels as shown in FIG. 8B. Therefore, if the selected voxel connectivity was 26-connected, in order to generate a positive jump in the x, y and z directions to locate a corresponding corner voxel, a jump of 73 voxels is required. However, if only a positive move in the x and y directions is needed, then a jump of 9 voxel spaces is required to locate the corresponding voxel that shares an edge. These same principles can be used to move in the positive or negative direction along any axis.

The scan-conversion method further includes determining the above described plurality of threshold variables $e_x$, $e_y$ and $e_z$. Without detracting from the generality of the method, we will assume that the largest direction of movement or change for the 3-D continuous line is the x-axis and that $\Delta x > 0$, $\Delta y > 0$ and $\Delta z > 0$. As a result, only the integer voxel-coordinate threshold variables $e_y$ and $e_z$ need to be utilized. Therefore, at each step in the x-direction along the continuous line, the method determines the y-coordinate and the z-coordinate of the voxel that is the best approximation to the 3-D continuous line. In order to accomplish this, only the two above-described threshold variables $e_y$ and $e_z$ are determined incrementally after each preceding voxel has been selected. The threshold variable $e_y$ monitors the movement of the y coordinate of the 3-D continuous line on the xy plane from $(x_1, y_1)$ to $(x_1 + \Delta x, y_1 + \Delta y)$ and $e_z$ monitors the movement of the z coordinate of the 3-D continuous line on the xz plane from $(x_1, y_1)$ to $(x_1 + \Delta x, z_1 + \Delta z)$.

As previously stated, for each step in the x-direction, a simple decision process is performed to determine whether or not to increment in the respective y and z coordinate direction when selecting the next voxel of the 3-D voxelized line.

The method further includes calculating a plurality of threshold variable increments $dy_x$, $dy_{xy}$, $dz_x$, and $dz_{xz}$ utilizing the set of geometric parameters and the selected voxel connectivity. The threshold variable increments are used to update the threshold variables in accordance with the voxel that was just selected so that the current value of the 3-D continuous line can be updated in order to decide on the next voxel to be selected.

After each voxel selection is made to represent a portion of the 3-D continuous line, access is provided to the Cubic Frame Buffer wherein a stepping process is performed in the Cubic Frame Buffer memory according to relative Cubic Frame Buffer memory address offsets. As previously described, the stepping process is accomplished by jumping across blocks of serial memory to locate the appropriate memory unit corresponding to the selected voxel representing the 3-D continuous line. Thereafter, the plurality of threshold variables are updated utilizing the threshold variable increments. The threshold variable increments update the threshold variables according to the voxel that was just selected. Therefore, if the just selected voxel was incremented in relation to the previous voxel location in both the y and z directions, then the threshold variables $e_y$ and $e_z$ would be incrementally updated.

The method may also include selecting a second voxel connectivity with which to represent the 3-D continuous line. Then, a plurality of connectivity switching variables will be determined in order to adjust the pre-computed decision variables. By utilizing the connectivity switching variables, the plurality of decision variables can be updated to conform to the newly selected second voxel connectivity.

The 3-D discrete ray traversal method of the present invention includes, for each pixel that makes up the screen that will display the scene, determining the voxels that are common to both the traversing 3-D discrete ray and the voxelized objects contained within the 3-D Cubic Frame Buffer. The boundaries of the 3-D Cubic Frame Buffer define the start and endpoints of the 3-D discrete ray. The discrete ray traversal commences at the closest endpoint, the discrete ray origin. The first non-transparent voxel encountered by the 3-D discrete ray indicates a ray-object encounter. When an encounter occurs, the attributes of the encountered voxel are readily available for access since these characteristics are stored in the voxel as previously mentioned. Volumetric ray tracing thus eliminates the need to search for an intersection among several objects that might have a portion of their whole present in a particular cell. Furthermore, unlike traditional ray tracing techniques, volumetric ray tracing does not necessarily compute the normal at the intersection point to generate secondary rays. Instead, the true normal vector to the surface is stored at each voxel location for use in spawning reflective and transmitted secondary rays.

Each surface voxel that represents the voxelized object also stores the color, illumination, and/or the texture for that voxel. This information is used for color composition of the scene. Since the texture mapping is view-independent, it is precomputed during the voxelization conversion from a 2-D or 3-D texture/photo map or a scene. As a result, there is no need to recompute the inverse mapping required for texture mapping every possible viewpoint.

The only geometric computation performed by the ray tracing phase is used to generate discrete rays, (i.e. spawn secondary rays) and to generate composite illumination values. Since all objects have been converted into one object type, (i.e., a plurality of unit voxels), the traversal of discrete rays can be viewed as a method for performing an efficient calculation of ray-voxel encounters. Therefore, the previously needed geometric ray-object intersection calculation is superfluous, which means that the current method is practically insensitive to the complexity of the scene being traversed. For example, the implementation of the volumetric ray tracing method of a 91-sphereflake (91 spheres of recursively diminishing sizes) over a checkerboard pattern floor with $320^3$ resolution has been generated in 72 seconds with the use of this method on a general purpose computer, while a 820-sphereflake was ray traced using the same method and computer in almost the same amount time (74.9 seconds).

Having only one type of object frees the ray tracer from any dependency on the type of object that makes up the image. The rendering time is sensitive to the total distance traversed by the rays, which depends primarily on the 3-D Cubic Frame Buffer resolution and the portion of the 3-D Cubic Frame Buffer occupied by the objects. It is thus not surprising to achieve improved performance when tracing scenes of higher complexity since the traversing rays travel a shorter distance before they encounter an object and generate an opaque composite illumination value.

It should be noted that the 3-D Cubic Frame Buffer represents the world resolution. In other words, the 3-D Cubic Frame Buffer, unlike the cells used by the space subdivision methods, is composed of voxels of which each represents only a single volume entity. This is also why 3-D Cubic Frame Buffers are suitable for the storage and rendering of sampled and computed datasets. The volumetric ray tracing approach provides, for the first time, true ray tracing (rather than ray casting) of sampled/computed datasets, as well as hybrid scenes where geometric and sampled/computed data are intermixed.

As was mentioned previously, every two consecutive voxels of a 6-connected ray are face-adjacent, which guarantees that the set of voxels along the discrete line includes all voxels pierced by the continuous line. A 6-connected ray from (x,y,z) to (x+Δx, y+Δy, z+Δz) (assuming integer line endpoints) has the total length of $n_6$ voxels to traverse, where $$n_6 = |\Delta x| + |\Delta y| + |\Delta z|.$$

In a 26 connected ray, every two consecutive voxels can be either face-adjacent, edge-adjacent, or corner-adjacent. The line has a length of $$n_{26} = MAX(|\Delta x|, |\Delta y|, |\Delta z|).$$

Clearly, except for the situation where the continuous line to be voxelized is parallel to a coordinate axis, a 26-ray is much shorter than a 6-ray:

$$1 \leq \frac{n_6}{n_{26}} \leq 3.$$

As stated above, when the line to be voxelized is parallel to one of the primary axes, it necessarily follows that $n_6 = n_{26}$ while approaching the main diagonal, the ratio of $n_6/n_{26}$ increases up to a maximum value of 3. Since the performance and speed of the volumetric ray tracer depends almost entirely on the total number of voxels traversed by the discrete rays, the method of the present invention is designed to utilize 26-connected rays between object surfaces because 26-connected rays can be generated at a faster rate than 6-connected rays. Therefore, the overall ray traversal method will be more efficient. In the preferred embodiment, the voxelized objects stored during the preprocessing stage are 26-tunnel-free. In other words, the object surfaces in the Cubic Frame Buffer are thick enough to eliminate possible penetration of a 26-connected ray through the surface. However, a 26-connected ray may not traverse all voxels pierced by the continuous ray and thus may skip a surface voxel in which the ray should actually encounter. Consequently, ray-surface hits may be missed at the object silhouette and occasionally the ray will hit a voxel which is underneath the true surface.

In a preferred embodiment of the invention and in order to avoid not encountering a voxel that is on the actual surface of the object, the method may include changing the connectivity of the traversing ray when it is in close proximity to a voxelized object. In the preferred embodiment, when the traversing ray is in close proximity to an object, the ray connectivity will be changed from 26-connected to 6-connected so that a surface voxel is not missed. By employing a 6-connected ray, some speed is sacrificed but this ensures that the traversing ray will pierce all voxels that should be encountered. However, by utilizing a 26-connected ray to traverse the region of the Cubic Frame Buffer between voxelized objects, this ensures that the system will operate at its optimum speed.

The operation of the preferred embodiment of the present method for generating a 2-D realistic image having a plurality of pixels will now be described. The method includes selecting a scene to be ray traced. Then, a discrete 3-D voxel representation of the scene is formed utilizing a plurality of voxels and it is stored in a Cubic Frame Buffer of voxels as shown in FIG. 8A. However, recall that FIG. 8A is used only for convenience and visualization purposes and that the Cubic Frame Buffer may actually have a serial configuration as shown in FIG. 8B.

Each voxel of the scene in the Cubic Frame Buffer is representative of a specific volume unit of each object of the scene. Stored at each voxel location within the Cubic Frame Buffer are attributes or characteristics of the corresponding portion of the object that the voxel represents. This scene/object voxelization process can be accomplished as previously described in this application or in accordance with the issued patents and pending application of Arie Kaufmen, one of the named inventors of this application. Specifically, the methods of voxelization are described in: "Method of Converting Continuous Three-Dimensional Geometrical Representations Into Discrete Three-Dimensional Voxel-Based Representations Within A Three-Dimensional Voxel-Based System" which issued on Aug. 6, 1991, as U.S. Pat. No. 5,038,302; "Method Of Converting Continuous Three-Dimensional Geometrical Representations Of Polygonal Objects Into Discrete Three-Dimensional Voxel-Based Representations Thereof Within a Three-Dimensional Voxel-Based System" which issued on Jan. 22, 1991, as U.S. Pat. No. 4,987,554; and "Method Of Converting Continuous Three-Dimensional Geometrical Representations Of Quadratic Objects Into Discrete Three-Dimensional Voxel-Based Representations Thereof Within A Three-Dimensional Voxel-Based System", which was filed on May 4, 1989, as Ser. No. 07/347,593, the disclosure of each of these references is incorporated herein by reference.

Figure 13:
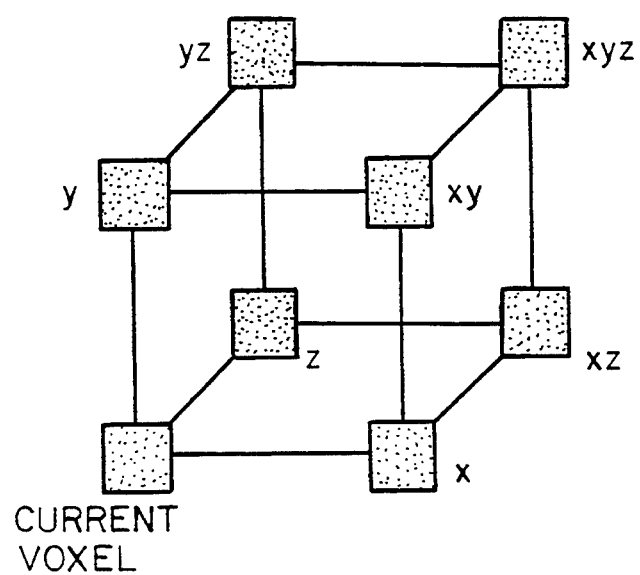
FIG. 13 is a representation of the possible neighboring voxel selections in the positive directions for a 26-connected object from the current voxel location.

Furthermore, the method includes selecting a voxel connectivity for a plurality of families of 3-D discrete rays that are to be traversed through the Cubic Frame Buffer of voxels to detect encounters with the voxelized representation of the scene. This initial ray voxel connectivity is usually 26-connected because this has been proven to be the most efficient. The rays that are to be traversed through the Cubic Frame Buffer must be voxelized. The ray voxelization step can be accomplished as previously described in this application. Specifically, a starting voxel is selected for each family of rays. Each pixel of the 2-D realistic image to be generated will have a corresponding family of 3-D discrete rays. Then a decision is made as to whether the best approximation of the line would include selecting the next voxel to have a change in the x, y, and/or z coordinates as shown in FIG. 13.

Once the selection of the voxel that best approximates the line is made, a stepping process from the current voxel location is performed in the Cubic Frame Buffer. In the preferred embodiment, the current voxel location is monitored by having a pointer indicate the current voxel. Since the Cubic Frame Buffer is serially connected and accessed as previously described, the stepping process includes jumping a specified number of units along the serial memory to locate the voxel that was chosen as the closest approximation to the traversing continuous ray.

The voxel decision and stepping process for the traversing ray is continued until a voxel that is selected for the approximation of the traversing ray coincides with a voxel that has an attribute indicating that the ray is in close proximity to a voxelized object. Then a second voxel connectivity, usually 6-connected, is selected to alter the connectivity of the traversing ray. By changing the connectivity to 6-connected, the chances of encountering a surface voxel of an object are greatly improved.

When a surface voxel of a voxelized object is detected by traversing a 6-connected ray, the attributes of the voxel are accessed by the ray. According to the shadow ray indicators, a shadow ray is sent to the light sources.

If the encountered voxel is not opaque, then at least one secondary ray is generated which simulates reflection and/or refraction and the traversal process is performed for the secondary ray as described above. In a preferred embodiment, the voxel connectivity of the secondary ray is 26-connected until a proximity indicator voxel is encountered wherein the connectivity is switched to 6-connected. When the secondary ray encounters a voxel corresponding to the surface of a voxelized object, the attributes of this voxel are added to the attributes of the voxel encountered by the primary ray to determine if another secondary ray should be generated. Additional generation of rays is created only if the expected contribution to the intensity of the final pixel value is significant. The encountered voxels are combined for each corresponding family of rays to provide a composite illumination value which corresponds to a pixel value for generating the 2-D realistic image of the scene.

The volumetric ray tracing method of the present invention completely eliminates the computationally expensive ray-object intersections of prior art methods. The volumetric ray tracing method relies upon a relatively fast discrete ray traversal through a 3-D Cubic Frame Buffer in order to locate a single opaque voxel. As a result, volumetric ray traversal is practically independent of the number of objects in the scene and the complexity of each object. Utilizing conventional ray tracing, computation time increases as the number of objects in the scene increases. This follows since in crowded scenes, a ray may pierce a substantial number of objects and there is a relatively high probability that a cell may contain more than one object that is intersected by the traversing ray. In contrast, the computation time for volumetric ray tracing is nearly constant and can even decrease as the number of objects in the scene increases since less stepping is required between objects before the ray encounters an object.

The above-described volumetric ray tracing method is advantageous because many view-independent attributes, such as the surface normal, texture color, and light source visibility and illumination can be precomputed during the voxelization phase and stored within each voxel so that when a particular voxel is encountered, the attributes are readily accessible. Volumetric ray tracing is also advantageous for ray tracing 3-D sampled datasets (i.e., 3-D MRI imaging) and computed datasets (i.e., fluid dynamics simulations), as well as hybrid models in which such datasets are intermixed with geometric models (i.e., a scalpel superimposed on a 3-D CAT data set ) .

Although the voxelization and ray traversal phases introduce aliasing, the true normal stored within each voxel is used for spawning secondary rays and can smooth the surface of the object. The aliasing artifacts can be further reduced by generating antialiased fuzzy objects during the voxelization phase, by supersampling during the ray tracing phase and/or by consulting an object table for the exact geometric structure at the point of the encounter.

The above-described method for generating a 2-D realistic image using discrete representations can be implemented using a computer graphic workstation as shown in FIG. 14.

The 3-D computer graphic workstation 1 is based upon 3-D voxel-based representation of objects within a large 3-D memory 2 referred to as a 3-D Cubic Frame Buffer, which includes a linear array of unit cubic cells called voxels. The workstation 1 is a multiprocessor system with three processors accessing the Cubic Frame Buffer 2 to input, manipulate, view and render the 3-D voxel images.

In general, the processors include a 3-D Frame Buffer Processor 3, a 3-D Geometry Processor 4, and a 3-D Discrete Ray Tracing Processor 5. The 3-D Frame Buffer Processor 3 acts as a channel for 3-D voxel-based images which have been "scanned" using a 3-D scanner 6 such as CAT or MRI medical scanners. The 3-D scanned voxel-based images are a source of Cubic Frame Buffer data. Once the voxel images are stored in the Cubic Frame Buffer 2, they can be manipulated and transformed by the 3-D Frame Buffer Processor 3, which also acts as a monitor for 3-D interaction.

The 3-D Geometry Processor 4 samples and thereafter converts or maps 3-D continuous geometric representations of a object, into their 3-D discrete voxel representation within the Cubic Frame Buffer 2. The 3-D continuous geometric representations comprise a set of voxel relationships which as a whole serve as a 3-D model of the object. This sampling and conversion process is typically referred to as a "scan-conversion" or "voxelization" process.

The 3-D Discrete Ray Tracing Processor 5 follows discrete rays of voxels in the Cubic Frame Buffer 2. The 3-D Discrete Ray Tracing Processor generates primary rays from each of the plurality of pixels of the 2-D video screen 9. By taking into consideration depth, translucency and surface inclination, the Discrete Ray Tracing Processor generates a 2-D realistic image of the cubic voxel-based image. The Discrete Ray Tracing Processor then provides a signal representing the 2-D realistic image into a conventional video processor 8, thereby updating the video screen with a 2-D shaded pixel image.

A preferred form of the 3-D Discrete Ray Tracing Processor 5 is shown in FIG. 15. The 3-D discrete Ray Tracing Processor is an image generations system that consists of Ray Manager 10 that provides definitions of primary rays according to the voxel connectivity to a Ray Retrieval Mechanism 11. For a given ray definition provided by the Ray Manager, the Ray Retrieval Mechanism 11 fetches from the Cubic Frame Buffer 2 the plurality of voxels which make up the discrete voxel form of the ray. The plurality of the voxels are provided to the Ray Projection Mechanism 12 from the Ray Retrieval Mechanism". The Ray Projection Mechanism 12 locates the first non-transparent voxel along the discrete voxel ray by using a Voxel Multiple Write Mechanism (not shown) as described in "Method And Apparatus For Storing, Accessing, And Processing Voxel-Based Data", which issued on Jan. 15, 1991, as U.S. Pat. No. 4,985,856 and "Method And Apparatus For Generating Arbitrary Projections of Three-Dimensional Voxel-Based Data", which will issue on Mar. 31, 1992. The disclosure of each of these references is incorporated herein by reference. In the alternative, other projection mechanisms can be utilized such as a tree of processors.

The result of locating the first non-transparent voxel, the locating of the point on the surface hit by the ray, is provided to the Ray Manager 10. The first non-transparent voxel information is utilized for spawning secondary rays and shadow rays. The definition of these rays are then transferred to the Ray Retrieval Mechanism 11. Additionally, the Ray Manager composites the color and light intensity of the voxels corresponding to point on the surface that is hit by the ray in the family of rays to produce a final image that is to be displayed on the Frame Buffer 7.

Figure 16:
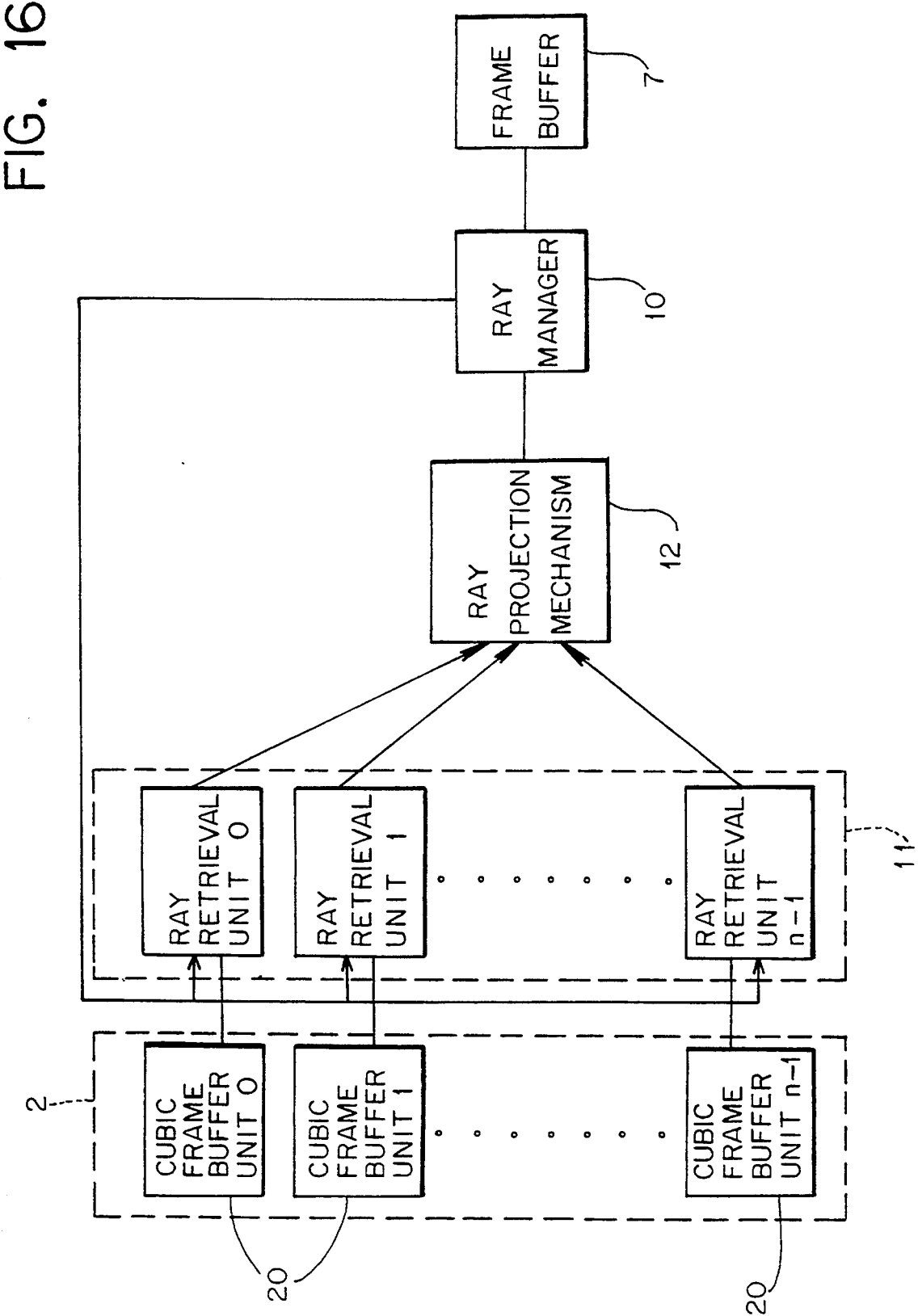
FIG. 16 is a block diagram of a parallel ray retrieval mechanism for a 3-D discrete ray tracing processor.

One implementation of the Cubic Frame Buffer 2 and the Ray Retrieval Mechanism 11 is based upon memory modulation as shown in FIG. 16. The Cubic Frame Buffer 2 is broken down into a plurality of Cubic Frame Buffer Units 20, each consisting of a plurality of voxels. Each Cubic Frame Buffer Unit 20 has a corresponding Ray Retrieval Mechanism of the plurality of Ray Retrieval Mechanisms 21. The Ray Manager 10 generates a ray definition as previously described and broadcasts the definition to the plurality Ray Retrieval Mechanisms 21 that compute, in parallel, the plurality of voxels to be fetched from a corresponding Cubic Frame Buffer Unit 20.

The plurality of voxels, comprising the discrete form of a 3-D continuous ray, is provided to the Ray Projection Mechanism 12 that can be implemented by a Voxel Multiple Write Bus (not shown) as described in the above-identified patents which have been incorporated by reference.

The above-identified workstation provides a full range of inherent 3-D interactive operations in a simple yet general workbench set-up. The workstation operates in both discrete 3-D voxel space and 3-D geometry space and provides ways in which to intermix the two spaces. Accordingly, the workstation can be used with inherent 3-D interaction devices, techniques and electronic tools, which support direct and natural interaction, generation, and editing of 3-D continuous geometrical models, 3-D discrete voxel images, and their transformations. Such a 3-D voxel-based graphics workstation is appropriate for many 3-D applications such as medical imaging, 3-D computer-aided design, 3-D animation and simulation (e.g. flight simulation), 3-D image processing and pattern recognition, quantitative microscopy, and general 3-D graphics interaction.

Although an illustrative embodiment of the present invention has been described herein with reference to the accompanying drawings, it is to be understood that the invention is not limited to the precise embodiment, and that various other changes and modifications may be effected therein by one skilled in the art without departing from the scope of spirit of the invention.

What is claimed is:

1. A method for generating a 2-D realistic image having a plurality of pixels, the method using discrete 3-D voxel representations of 3-D continuous objects that make up a scene, the method comprising:

a) forming a discrete 3-D voxel representation of each 3-D continuous object, each discrete 3-D voxel representation utilizing a plurality of voxels, each voxel representing a particular unit volume of the 3-D continuous object, each voxel having a plurality of attributes corresponding to characteristics of a corresponding unit volume of the 3-D continuous object;

b) storing each discrete 3-D voxel representation in a 3-D cubic frame buffer of voxels;

c) selecting a voxel connectivity for a plurality of families of 3-D discrete rays, each 3-D discrete ray of each family of 3-D discrete rays being formed according to the selected voxel connectivity, each family of 3-D discrete rays including at least one ray;

d) traversing the at least one ray of each family of 3-D discrete rays from a corresponding pixel through the 3-D cubic frame buffer of voxels, the traversal of the at least one ray of each family of 3-D discrete rays being performed for each of the plurality of pixels of the 2-D realistic image;

e) detecting encounters for each of the plurality of families of 3-D discrete rays with the discrete 3-D voxel representations, each encounter providing illumination values for each family of 3-D discrete rays; and f) combining the illumination values to provide a composite illumination value for each of the plurality of families of 3-D discrete rays, each composite illumination value corresponding to a pixel value for generating the 2-D realistic image.

2. A method for generating a 2-D image having a plurality of pixels and using discrete 3-D voxel representations of 3-D continuous objects as defined by claim 1 wherein the plurality of voxel attributes include a proximity indicator, the proximity indicator denoting a nearness to a 3-D object, and wherein when the proximity indicator is encountered by one of the plurality of families of 3-D discrete rays, the voxel connectivity of the family of 3-D discrete rays is reselected.

3. A method for generating a 2-D image having a plurality of pixels and using discrete 3-D voxel representations of 3-D continuous objects as defined by claim 1 wherein the plurality of voxel attributes include a light source illumination indicator, the light source illumination indicator denoting whether a corresponding light source is visible from a voxel location, not visible from a voxel location or partially visible from a voxel location, wherein shadow-illumination rays are generated in a direction of a corresponding light source if the light source illumination indicator denotes that the light source is partially visible from the corresponding voxel.

4. A method for generating a 2-D image having a plurality of pixels and using discrete 3-D voxel representations of 3-D continuous objects as defined by claim 1 wherein the family of 3-D discrete rays includes a primary ray.

5. A method for generating a 2-D image having a plurality of pixels and using discrete 3-D voxel representations of 3-D continuous objects as defined by claim 4 wherein the family of 3-D discrete rays also includes at least one secondary ray.

6. A method for generating a 2-D image having a plurality of pixels and using discrete 3-D voxel representations of 3-D continuous objects as defined by claim 4 wherein when an encounter is detected between the primary ray and one of the discrete 3-D voxel representations a secondary ray is generated.

7. A method for generating a 2-D image having a plurality of pixels and using discrete 3-D voxel representations of 3-D continuous objects as defined by claim 6 wherein the secondary ray is generated by referring to the primary ray and the attributes of the encountered voxel.

8. A method for generating a 2-D image having a plurality of pixels and using discrete 3-D voxel representations of 3-D continuous objects as defined by claim 6 wherein when an encounter is detected between a first secondary ray and the 3-D discrete voxel representation, at least a second secondary ray is generated.

9. Apparatus for generating a 2-D image having a plurality of pixels using discrete 3-D voxel representations of 3-D continuous objects that make up a scene as defined by claim 1 wherein the means for traversing each family of 3-D discrete rays includes:
 a) a ray retrieval mechanism coupled to the 3-D Cubic Frame Buffer of voxels, the ray retrieval mechanism fetching from the 3-D Cubic Frame Buffer of voxels a plurality of voxels which make up a discrete voxel form of the families of 3-D discrete rays;
 b) a ray projection mechanism coupled to the ray retrieval mechanism and receiving the plurality of voxels that make up the discrete voxel form of the families of 3-D discrete rays, the ray projection mechanism locating the first non-transparent voxel along the discrete voxel form of the families of 3-D discrete rays; and
 c) a ray manager coupled to the ray retrieval mechanism, the ray manager also being coupled to the ray projection mechanism, the ray manager receiving a signal from the ray projection mechanism indicating that an encounter has been detected between a family of 3-D discrete rays and the discrete 3-D voxel representations, the ray manager providing a signal to the ray retrieval mechanism denoting a definition of the next ray to be accessed from the 3-D Cubic Frame Buffer of voxels.

10. A method for generating a three-dimensional (3-D) discrete voxel representation of a 3-D continuous ray within a Cubic Frame Buffer, the method comprising:
 a) determining a plurality of geometric parameters which represent the 3-D continuous ray;
 b) setting a pointer in the Cubic Frame Buffer according to a start point of the 3-D continuous ray;
 c) selecting a first voxel connectivity corresponding to the set of geometric parameters which represent the 3-D continuous ray in 3-D discrete voxel space;
 d) determining a set of relative Cubic Frame Buffer memory address offsets which interrelate neighboring voxels of the Cubic Frame Buffer;
 e) calculating a plurality of threshold variables utilizing the set of geometric parameters and the selected voxel connectivity;
 f) calculating a plurality of threshold variable increments according to the selected voxel connectivity;
 g) determining a voxel along the 3-D continuous line based upon a family of decisions using the threshold variables;
 h) stepping along the Cubic Frame Buffer memory to locate the voxel according to the relative Cubic Frame Buffer memory address offsets; and
 i) updating the plurality of threshold variables utilizing the plurality of threshold variable increments.

11. A method for generating a 3-D discrete voxel representation of a 3-D continuous ray as defined by claim 10, the method further comprising:
 a) selecting a second voxel connectivity with which to represent the 3-D continuous ray;
 b) determining a plurality of connectivity switching variables; and
 c) updating the plurality of decision variables utilizing the connectivity switching variables.

12. A method for generating a 3-D discrete voxel representation of a 3-D continuous ray as defined by claim 11, wherein the first voxel connectivity is 26-connected and the second voxel connectivity is 6-connected.

13. A method for generating a three-dimensional (3-D) voxel representation of a two-dimensional (2-D) continuous object in 3-D space comprising:
 a) selecting a surface connectivity;
 b) determining a set of geometric parameters corresponding to the 2-D continuous object in 3-D space;
 c) specifying a base line and a template line based upon the geometric parameters;
 d) selecting a voxel connectivity for the base line based upon the selected surface connectivity;
 e) selecting a voxel connectivity for the template line based upon the selected surface connectivity;
 f) generating voxel representations for the base line and the template line according to the selected voxel connectivities and based upon the specified geometric parameters;
 g) determining the boundaries of the 2-D continuous object in 3-D space according to the geometric parameters;
 h) storing the base line and template line according to the selected voxel connectivity in a Cubic Frame Buffer of voxels; and
 i) replicating the template line for each voxel along the base line, the replication being performed within the boundaries of the 2-D continuous object in 3-D space,
 j) storing the replicated template lines in the Cubic Frame Buffer of voxels.

14. Apparatus for generating a two-dimensional (2-D) realistic image having a plurality of pixels using discrete three-dimensional (3-D) voxel representations of 3-D continuous objects that make up a scene, the apparatus comprising:
 a) means for forming a discrete 3-D voxel representation of each 3-D continuous object utilizing a plurality of voxels, each voxel representing a particular unit volume of the 3-D continuous object, each voxel having a plurality of attributes corresponding to characteristics of a corresponding unit volume of the 3-D continuous object;
 b) a 3-D Cubic Frame Buffer of voxels;
 c) means for storing each discrete 3-D voxel representation in the 3-D Cubic Frame Buffer of voxels;
 d) means for selecting a voxel connectivity for a plurality of family of 3-D discrete rays, each ray of the plurality of families of 3-D discrete rays being formed according to the selected voxel connectivity;
 e) means for traversing each family of 3-D discrete rays through the 3-D Cubic Frame Buffer of voxels, the traversal of the plurality of families of 3-D discrete rays being performed for the plurality of pixels of the 2-D realistic image;

f) means for detecting encounters for each of the plurality of families of 3-D discrete rays with the discrete 3-D voxel representations, each encounter providing illumination values for each family of 3-D discrete rays;

g) means for combining the illumination values to provide a composite illumination value for each of the plurality of families of 3-D discrete rays, each composite illumination value corresponding to a pixel value for generating the 2-D realistic image; and h) a video screen for displaying the composite illumination values, the video screen having a plurality of pixels, each composite illumination value corresponding to one pixel of the plurality of pixels of the video screen, the video screen providing a 2-D realistic image of the scene.

* * * * *